(12) United States Patent
Yamaguchi

(10) Patent No.: US 7,692,338 B2
(45) Date of Patent: Apr. 6, 2010

(54) DIRECT CURRENT SUPERCONDUCTING POWER TRANSMISSION CABLE AND SYSTEM

(75) Inventor: Sataro Yamaguchi, Kasugai (JP)

(73) Assignee: Kabushiki Kaisha Y.Y.L., Tokyo (JP)

( * ) Notice: Subject to any disclaimer, the term of this patent is extended or adjusted under 35 U.S.C. 154(b) by 1159 days.

(21) Appl. No.: 11/183,876

(22) Filed: Jul. 19, 2005

(65) Prior Publication Data

US 2007/0084623 A1    Apr. 19, 2007

(30) Foreign Application Priority Data

Jul. 20, 2004    (JP) .............................. 2004-211026

(51) Int. Cl.
*H01B 5/00*    (2006.01)
(52) U.S. Cl. .................... 307/147; 174/126.1
(58) Field of Classification Search ................ 307/147; 174/125.1, 126.1; 505/230, 430
See application file for complete search history.

(56) References Cited

U.S. PATENT DOCUMENTS

| | | | |
|---|---|---|---|
| 3,657,467 A * | 4/1972 | Matthaus et al. ........... 174/15.5 |
| 3,758,701 A | 9/1973 | Schmidt | |
| 3,992,169 A * | 11/1976 | Loudon ....................... 62/50.7 |
| 4,394,534 A * | 7/1983 | Bahder et al. ............... 174/15.5 |
| 4,845,308 A * | 7/1989 | Womack et al. ............. 174/15.4 |
| 4,947,007 A * | 8/1990 | Dew et al. ................... 174/15.5 |
| 6,112,531 A | 9/2000 | Yamaguchi | |
| 6,354,087 B1 * | 3/2002 | Nakahara et al. .................. 62/6 |
| 6,730,851 B2 * | 5/2004 | Ladie' et al. ............. 174/125.1 |
| 7,009,104 B2 * | 3/2006 | Spreafico .................... 174/15.5 |

FOREIGN PATENT DOCUMENTS

| | | |
|---|---|---|
| CN | 1387666 A | 12/2002 |
| JP | 10-112407 A | 4/1998 |
| JP | 2002075082 A * | 3/2002 |
| JP | 2003-217735 A | 7/2003 |
| JP | 2003-33746 A | 11/2003 |
| WO | 01/33579 A1 | 5/2001 |

* cited by examiner

*Primary Examiner*—Albert W Paladini
(74) *Attorney, Agent, or Firm*—Sughrue Mion, PLLC

(57) ABSTRACT

A power transmission cable with easy laying, reduced heat invasion and enhanced efficiency. The cable comprises an inner pipe 105 encasing a refrigerant passage 101, a superconducting member 102 and an electrically insulating portion 103; an outer pipe 106; a vacuum adiabatic insulating section 104 between the inner and outer pipes; an inner pipe support ring disposed between the inner and outer pipes so that it is slidable along the outer side of the inner pipe; an outer pipe support ring fixed to the inner side of the outer pipe; and a support member which is disposed between the inner and outer pipe support rings.

30 Claims, 11 Drawing Sheets

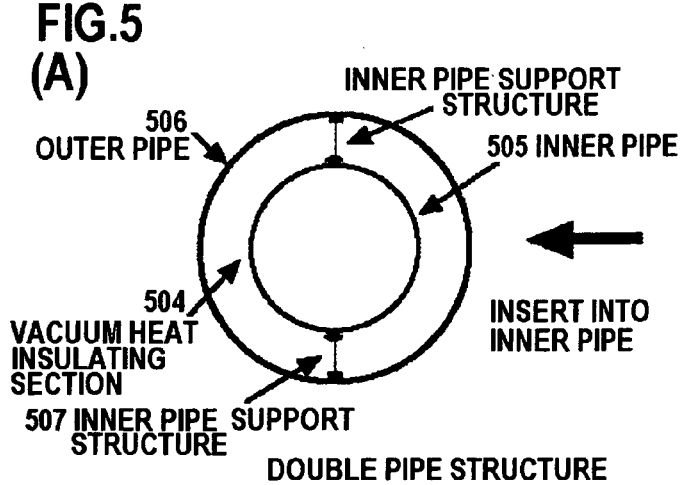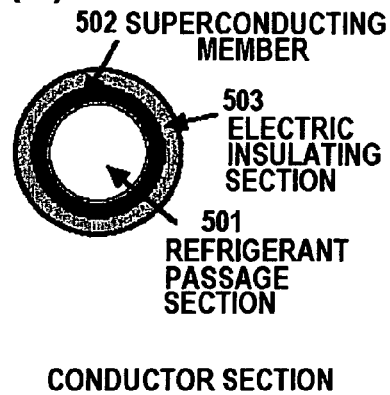
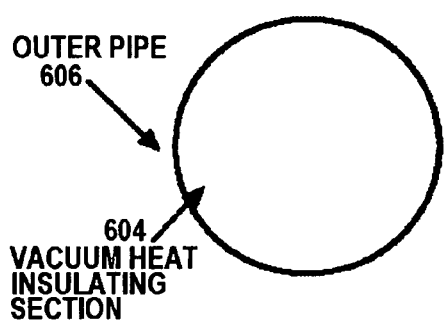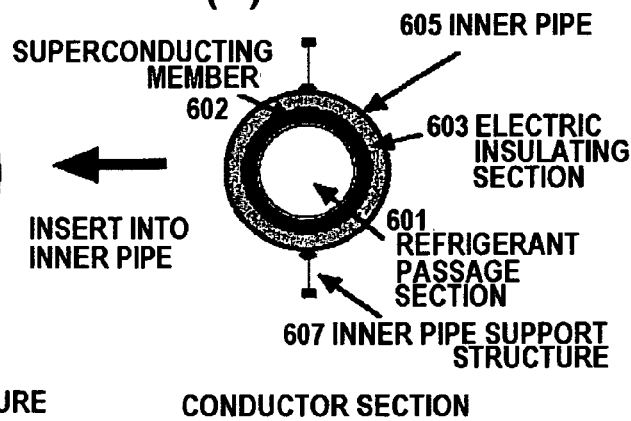
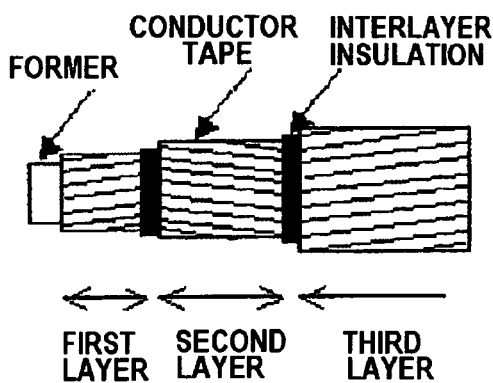

MULTIPLE THREE-PHASE SUPERCNODUCTING CABLE

DIRECT CURRENT SUPERCONDUCTING POWER TRANSMISSION CABLE AND SYSTEM

FIELD OF THE INVENTION

The present invention relates to a superconducting power transmission cable and a direct current power transmission system using the same.

BACKGROUND OF THE INVENTION

Various structures of superconducting power transmission cable have heretofore been proposed. Ease of laying working and improvements in heat invasion countermeasures has been demanded. For further information on the superconducting cables, following patent specifications 1 and 2 are referenced. For information on an current terminal having a thermoelectric transducer element, patent document 3 is referred to.

[Patent Document 1] JP Patent Kokai Publication P2003-333746A

[Patent Document 2] JP Patent Kokai Publication H10-112407A

[Patent Document 3] JP Patent Kokai Publication P2003-217735A

SUMMARY OF THE DISCLOSURE

Therefore, it is an object of the present invention to provide a cable and direct current power transmission system in which laying working thereof is easier, heat invasion is reduced and power transmission efficiency is improved.

According to the present invention, there is provided a superconducting power transmission cable featured as follows:

In one aspect of the present invention, there is provided a superconducting power transmission cable comprising: a first pipe (inner pipe) encasing a superconducting member therein; and a second pipe (outer pipe) disposed externally of the first pipe; the first pipe being vacuum-adiabatically insulated from the second pipe; and further comprising support unit between the first and second pipes for supporting the first and second pipes in a radial direction. The support unit comprises a first pipe support ring between the first and second pipes, which abuts on the outer wall of the first pipe; a second pipe support ring between the first and second pipe, which is adapted into the inner wall of the second pipe; and a support member disposed between the first and second pipe support rings.

In an embodiment, the inner pipe (first pipe) is provided with a refrigerant passage, the superconducting member and an electrically insulating layer.

In an embodiment, the support member comprises a support bar having one end connected to the first pipe support ring and the other end which is connected to the second pipe support ring.

In the present invention, the support member comprises a first support bar having one end which is connected to the first pipe support ring; a second support bar having one end which is connected to the second pipe support ring; and a connecting member which connects the other ends of the first and second support bars to each other. The connecting member fixes the first and second support bars so that it is capable of adjusting the longitudinal position of the first and second support bars.

In an embodiment, the first pipe may comprise a bellows pipe.

In an embodiment, the system comprises an insulator member in the vacuum adiabatic insulating section.

In an embodiment, the superconducting member has a superconducting tape conductor (strands) portion comprising a former on which the tape conductor is wound.

In an embodiment, at an ambient temperature end of the cable, superconducting strands are connected to a first feed-through which performs vacuum sealing and electrical insulation, the superconducting strands are connected to a second feed-through between the vacuum and the atmosphere side from the first feed-through via leads. A thermoelectric transducer element is connected to the second feed-through for reducing the heat invasion and is connected to an external power supply via a cable from the second feed-through.

In an embodiment, at a connection between the superconducting power transmission cables, superconducting strands of a first cable are connected to a feed-through which performs vacuum sealing and electrical insulation and are connected via a feed-through to a second cable to which the first cable is to be connected, via a lead portion from the first feed-through. A thermoelectric transducer element is connected to the lead portion and a third feed-through which reduces heat invasion into a lower temperature portion is connected.

The superconducting power transmission cable system of the present invention may include a sensor including a vacuum gauze at the lead portion; and a monitor apparatus for monitoring a result of measurement of the sensor.

In an embodiment, at a branch connection between the cables, superconducting strands of a first cable are connected to a feed-through which electrically insulates from a vacuum seal and are connected to another feed-through of a second cable to which a branch is to be connected from the first feed-through via the lead portion and superconducting strands are connected to the feed-through of the second cable to which the branch is to be connected.

At a connection between super-conducting power transmission cables, the connection comprises a dynamic (outer) bellows pipe. In the dynamic (outer) bellows pipe a first (inner) pipe connected via a flange to the pipe (stainless steel, iron) is accommodated, which (pipe) encases the first (inner) pipe of the cable. The first (inner) pipe is connected to a cable fixing portion via the dynamic (outer) bellows pipe having a variable length and being evacuated. The first (inner) pipe (bellows pipe) within the dynamic (outer) bellows pipe is connected to the first (inner) pipe in the cable fixing portion. The cable fixing portion may comprise a support unit (or member) which supports a first pipe within the cable fixing portion.

In an embodiment, the cable connecting portion and a platform which encases the pipe are movable. The dynamic bellows pipe may include a flange, and a support unit (or member) may support the first pipe (bellows pipe) within the dynamic bellows pipe at the flange.

In an embodiment, at an ambient temperature end of the cable, superconducting strands are connected to a first feed-through which performs vacuum sealing and electrical insulation, and are connected to a second feed-through between the vacuum and the atmosphere side via leads from the first feed-through. One of the superconducting strands is connected to corresponding one inverter via the second feed-through.

In an embodiment, at the ambient temperature end of the cable, superconducting strands are connected to a first feed-through which performs vacuum sealing and electrical insulation, and are connected to a second feed-through between the vacuum and the atmosphere side via leads from the first feed-through. A plurality of cables output from the second feed-through are commonly connected to a commonly connected output of a plurality of inverters.

In another embodiment, at the ambient temperature end of the cable, superconducting strands are connected to a first feed-through which performs vacuum sealing and electrical insulation, and are connected to a second feed-through between the vacuum and the atmosphere side via leads from the first feed-through. A cable is connected to the superconducting strands at their ambient temperature side thereof. The lead portion comprises a gas cooled current lead which is cooled with a low temperature gas supplied from the refrigerant.

In an embodiment, the system comprises a cover which encases the lead portion and covers a space between the first and second feed-throughs. A low temperature gas resulting from the refrigerant for cooling the superconducting strands is caused to flow within the cover.

In an embodiment, at an ambient temperature end of the cable, superconducting strands are connected to a first feed-through which performs vacuum sealing and electrical insulation, and are connected to a second feed-through between the vacuum and the atmosphere side via leads from the first feed-through. A cable is connected to the superconducting strands on the ambient temperature side thereof via the second feed-through. An electrode bar (or pin) is in the form of hollow cylinder (or tube) and a low temperature gas flows therethrough. A lead connected to the electrode bar is in the form of hollow cylinder, and the low temperature gas flows therethrough.

EFFECT OF THE INVENTION

In accordance with the present invention, laying working becomes easier, heat invasion at the ambient temperature end portion, connection portion or branch portion is reduced and transmission efficiency is improved.

BRIEF DESCRIPTION OF THE DRAWINGS

FIG. 5 shows an assembly method 1 of one embodiment of the present invention;

FIG. 6 shows an assembly method 2 of one embodiment of the present invention;

FIG. 7 shows a former and the conductor portion structure;

EXPLANATION OF NUMERALS

Figure 1:
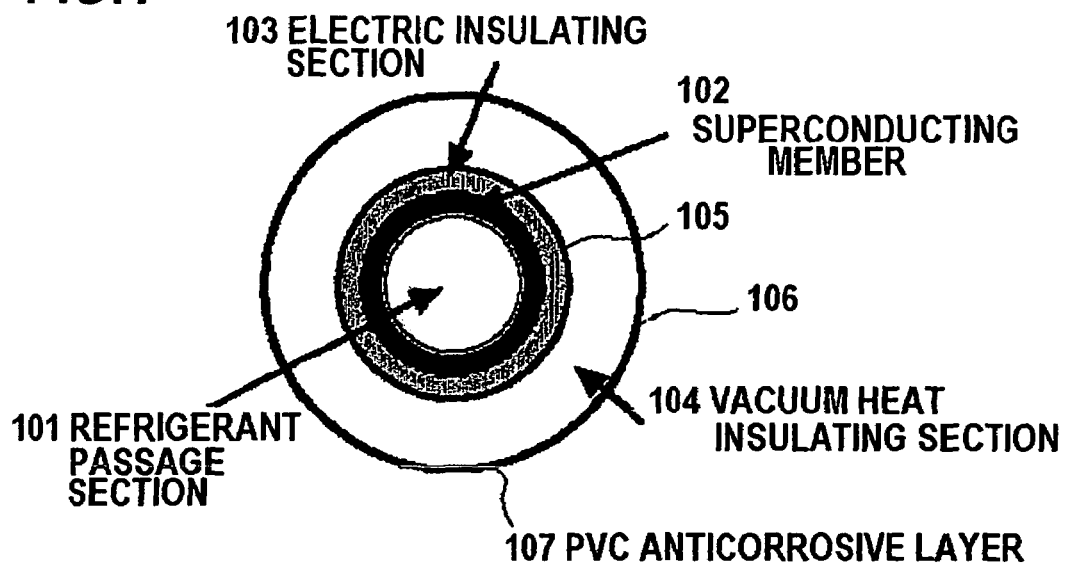
FIG. 1 shows a cross-sectional structure of a cable of one embodiment of the present invention.

101 refrigerant passage section
102 superconducting member
103 electric insulating section
104 vacuum adiabatic insulating section
105 inner pipe
106 outer pipe
107 PVC anticorrosive layer
201 inner pipe support ring (annular support member)
202, 402 outer pipe support ring
203 support bar
301 inner pipe support ring
302 outer pipe support ring
303 support bar
305 inner pipe
306 outer pipe
307 super-insulation
403A, 403B support bars
403C coaxial structure (coupling)
501 refrigerant passage section
502 superconducting member
503 electric insulating section
504 vacuum adiabatic insulating section
505 inner pipe
506 outer pipe
507 inner pipe structure
601 refrigerant passage section
602 superconducting member
603 electric insulating section
604 vacuum adiabatic insulating section
605 inner pipe
606 outer pipe
607 inner pipe support structure
902 strands (superconductive)
904 vacuum
905 inner pipe
906 outer pipe
911 feed-through 1
912 feed-through 2
913 copper lead
914 cable
915 semiconductor
1002 strands (superconductive)
1004 vacuum
1012 copper lead
1015 semiconductor
1016, 1116 interterminal fixture
1120 apparatus (measuring and monitoring)
1301 platform
1305 pipe (inner)
1306 straight pipe 1307 pump
1310 dynamic bellows pipe
1320 fixing portion
1502 strands
1520 inverter
1602 strands
1613 copper lead
1616 semiconductor
1620 inverter
1704 vacuum adiabatic insulating section
1717 lead cover
1718 gas

PREFERRED EMBODIMENTS OF THE INVENTION

Embodiments of the present invention will now be described with reference to drawings. FIG. 1 is a view showing a cross-sectional structure of one embodiment of the present invention. The sectional structure comprises a passage 101 for a refrigerant which is disposed in an innermost position in a radial direction, a superconducting member 102, an electrically insulation section 103 and a vacuum adiabatic insulating section 104 and an anti-corrosive layer 107 made of, for example, PVC (polyvinyl chloride) which is disposed as an outermost layer.

Assembling of the inventive superconducting power transmission cable system may be carried out by an technique of inserting an integral subassembly comprising the refrigerant passage 101, superconducting member 102, and an electrical insulating section 103 into an inner pipe 105 which constitutes a first pipe, or by a technique of integrating the passage 101, super conductor 102, insulating section 103 and inner pipe 105 together.

A space between an outer pipe 106 which constitutes a second pipe and the inner pipe 105 which constitutes a first pipe is evacuated for adiabatic insulation. In order to provide an enhanced thermal insulation performance, a plurality of sheets, each comprising a thin film coated with aluminum (referred to as "super-insulation film") are inserted into this space. This reduces heat invasion due to radiation into the inner portion of the cable.

The super-insulation increases the surface area which is in contact with the evacuated or vacuum space. In order to increase the vacuum in the space, it is necessary to consider the performance of a vacuum pump and heat conductance. The thickness of the vacuum adiabatically insulating space depends upon the ratio of the performance of the vacuum pump and conductance to the vacuum adiabatically insulating performance.

The inner pipe 105 will be thermally contracted. For example, the inner pipe 105 will be thermally contracted by about 30 m for a cable having a length of 10 km. Thus, it is necessary that the inner pipe 103 be longer than the outer pipe 106 by a length of thermal contraction. Alternatively, a structure which allows the thermal contraction is necessary.

Since the outer pipe 106 is at ambient temperatures, use of straight piping having a normal flat surface can reduce the manufacturing cost. Bellows type piping may be used. A adiabatically insulating double pipe structure (outer and inner pipes 106 and 105, respectively) may be made of a ferromagnetic material. A ferromagnetic material such as directional silicon steel plate and the like may be disposed on the outside of the adiabatically insulating double pipe structure. The ferromagnetic plate is wound, for example, on the outer pipe 106.

Since the inner pipe 105 which is at temperatures lower than those of the outer pipe is subject to thermal contraction, it is preferable to use the bellows type pipe. If the inner pipe 106 is offset from the center, adiabatically insulating performance becomes worse. Therefore, there is provided a cable structure so that the inner pipe is constantly coaxial with the outer pipe 106.

Figure 2:
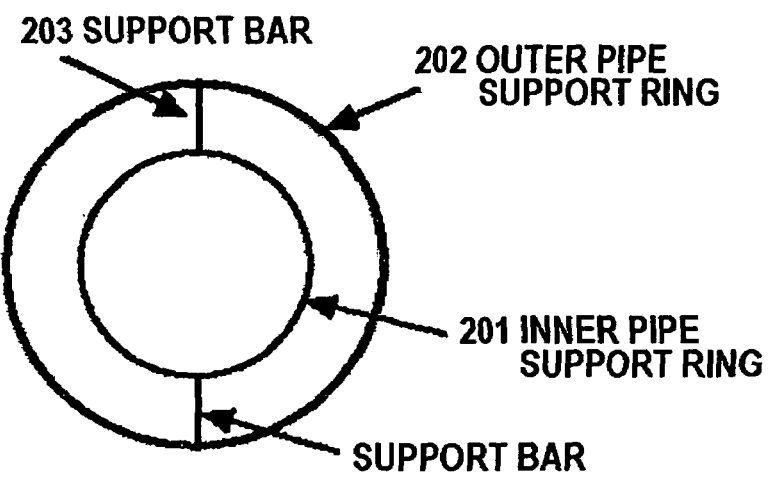
FIG. 2 shows a cross-sectional structure of an inner pipe support structure of one embodiment of the present invention.

A cross section of an inner pipe support structure for forming such a cable structure is illustrated in FIG. 2. The cable system of the present invention further comprises a ring (annular member) 202 which is adapted to the inner surface of the outer pipe 106 and a ring 201 which is adapted to the outer surface of the inner pipe 105. The rings are linked (or coupled) to each other by support bars 203. Disposing such a structure in the vacuum adiabatically insulating space 104 in FIG. 1 enables the inner pipe 105 to be constantly coaxial with the outer pipe 106. The number of the support bars 203 is not limited to 2, but may be 4, 3 or even 1. It may be determined depending upon the degree of heat invasion, the magnitude and direction of a force imposed upon the support bar. The support bar 203 is made of any one of a stainless steel, FRP, GFRP, which is a material having a thermal conductivity which is low in the range from ambient temperatures to low temperature and a high yield stress.

Figure 3:
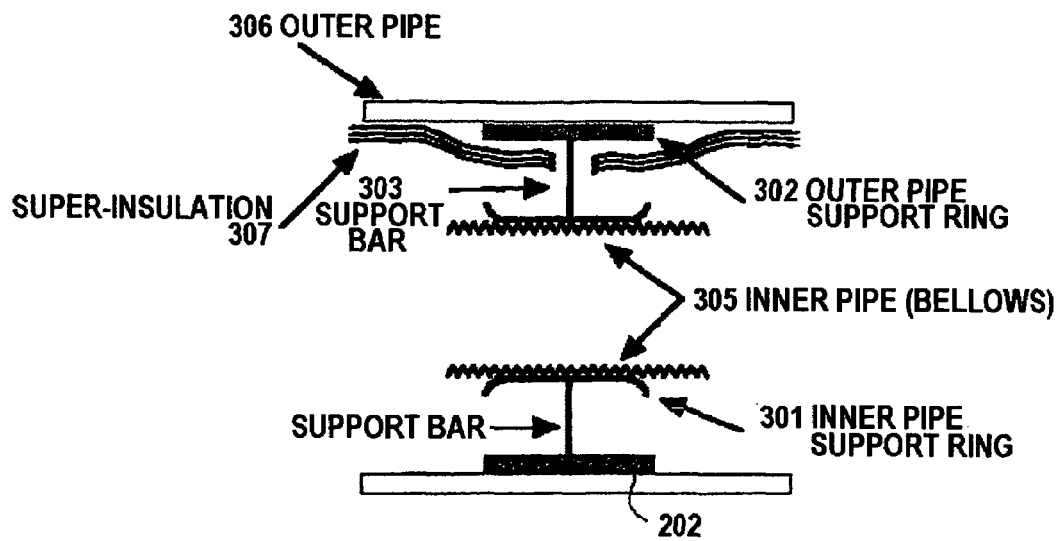
FIG. 3 shows an elevational structure of the inner pipe support structure of one embodiment of the present invention.

FIG. 3 shows an elevational view (longitudinal cross-section) of the support structure of the inner pipe 105. In the example, the outer and inner pipes 306 and 305 are straight and of bellows type, respectively. The support ring 302 for the outer pipe may be fixed to the outer pie 306. This makes the support firmer. The support ring 301 for the inner pipe supports the inner pipe 305 at a distance from the outer pipe 306 as shown in the drawing. Since the inner pipe 305 is thermally contracted, the support structure should allow the inner pipe to slide and thus, it is not fixed. Thus, it is preferable to provide a lubricating film made of, for example, TEFLON (registered trademark) at the contact area between the inner pipe support ring 301 and the inner pipe 305. The super-insulation 307 is wound inside the wall of the outer pipe. Since the super-insulation is not thermally contracted, it is preferred to arrange the super-insulation 307 so as to urge biasing against the outer pipe 306 from the side of the inner pipe 305. In case where the super-insulation 307 is wound on the inner pipe 305, it is divided (or slit) so as to avoid the support bar(s). The inner pipe support structure shown in FIG. 3 is mounted where the outer pipe 306 is welded. For example, the support structures may be disposed at regular intervals along the length of the pipe.

Since the support bar 301 may cause heat invasion in FIG. 3, the resistance to heat of the support bar 303 is increased. In order to simplify mounting of the support bar 303, it is preferable to make the support bar 303 as shown in FIG. 4.

Figure 4:
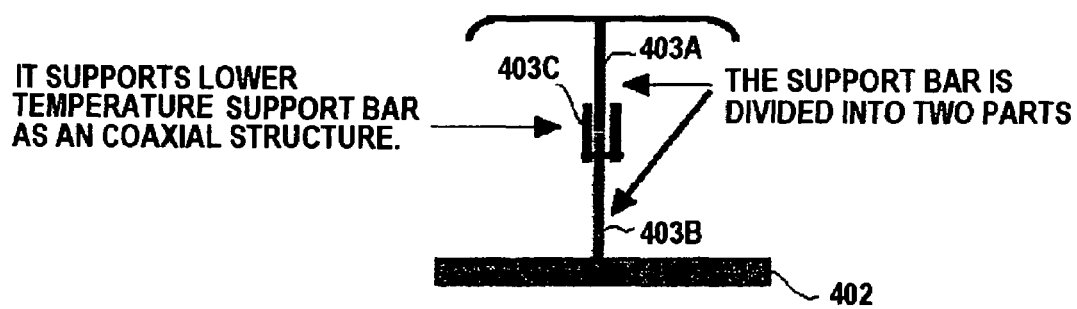
FIG. 4 shows a support structure of the inner pipe support structure of one embodiment of the present invention.

FIG. 4 is a view showing a structure of a support bar for supporting the inner pipe. The support bar 303 is divided into two support bar parts 403A, 403B. Heat conduction is conducted via the surface of two support bar parts 403A, 403B. Since the support bar comprises two support bar parts, the heat resistance is remarkably increased in comparison with the integral support bar, so that heat invasion is generally reduced. A coaxial coupling structure 403C for linking the two support bar parts 403A, 403B to each other is provided to form a mutually radially slidable coupling. The coaxial coupling structure 403 supports the lower temperature support bar part and is movable in a radial (upward or downward) direction and adjustable, e.g., by means of bolts (not shown). Such an arrangement makes the mounting of the support bars easier.

Now, assembly of the cable system will be described. Two pipes 505 and 506 are previously assembled into a double shell structure and the superconducting member 502 is inserted into the assembly of the double shell pipes 505 and 506. At this time, the inner pipe 505 is disposed in the center of the outer pipe by means of an inner pipe support structure 507. The pipe assembly is firstly laid in a common-use conduit (or groove). This laying work is similar to those of gas or water supply pipes. At this time, a plurality of sheets of the super-insulation film are provided in the vacuum adiabatically insulating space 504. The surfaces of two pipes 505 and 506 which face on the vacuum side may be plated or polished to provide an increased reflection factor of the surface.

The inner pipe 505 is supported on the outer pipe 506 by means of the inner pipe support structure 507.

First, a superconducting member is introduced into the inner pipe 505 followed by e.g., winding up on a reel. Then, it is wound out from the reel and inserted into the outer pipe. In order to reduce the friction coefficient of the superconducting member, a Teflon tape is wound around the surface of the superconducting member, which forms an electric insulating section 503. The inner pipe 505 may be coated on its inner surface with Teflon. The inner pipe is unwound from a reel for insertion into the outer pipe.

FIG. 6 is a view explaining another assembly technique. An inner pipe 605 is to be disposed in the center of an outer pipe by means of an inner pipe support structure 607. The superconducting member 602 is assembled into the inner pipe 605 with its support structure 607 to form an assembly. This assembly is then inserted into the outer pipe 606. A super-insulation is wound on the superconducting member followed by insertion into the inner pipe 605. Since the inner pipe support structures 607 are provided at predetermined intervals, assembly becomes easier if the support structures are provided at an end of the outer pipe 607 where the outer pipe 606 is connected.

Since the superconducting member 602 is protected by the inner pipe 605, it is resistive to the damage when it is moved or transported. The inner pipe 605 is made of, e.g., a stainless steel alloy, while the outer pipe may be made of iron. Since this combination increases the inductance of the cable, the power storage capacity can be enhanced when a d. c. current is used. This also reduces the cost of the materials used for the pipes and provides a magnetic shielding effect depending upon the direction of the cable laying and the operating conditions.

The structure of the superconducting member to be inserted into the inside of the inner pipe will now be described. A superconductor tape or tapes (wires) is/are wound on a frame which is positioned in the innermost position in a radial direction (referred to as "former" i.e., forming core aid for tape wire winding) in a helical configuration. All the tapes are electrically insulated.

FIG. 7 is a view showing the structure of the former and the conductor tape portions. As shown in FIG. 7, the tape wires which are wound on the former are multi-layered (first to third layers are illustrated in the drawing). Interlayer insulation is interposed between every neighboring tape wire layers. The former is formed of, e.g., a bellows pipe so that it is flexible.

Figure 8:
FIG. 8 shows an a. c. superconducting power transmission cable.

FIG. 8 shows the structure of an a. c. superconducting power transmission cable system. In this example, the cable system is a three-phase superconducting cable in which a bellows type pipe is used for the former.

A refrigerant is passed through the inside (central core) of the former. The bellows pipe is provided on its wall with a multiplicity of small wound holes and/or linear slits so that the refrigerant comes into a close contact with the wound tape wires. This enables the refrigerant to be in direct contact with the SC (superconductive) wires and the refrigerant to increase its cooling efficient. In an example in which no bellows pipe is used for the former, similar former may be made of a mesh of wire. Alternatively, the former may be formed by mounting a plate which is in the form of bridge plates on the surface of the bellows pipe and winding the wires on the plates. Adopting such a structure enables the refrigerant to be in a direct contact with the wires and enables the cable to be easily flexed, so that cable laying working becomes easier.

The pressure loss when the refrigerant is pumped depends upon the structure of the former.

In the example shown in FIG. 7, the SC (superconductive) wires of respective layers are wound at respective helical pitches. In this structure, two forces which direct in outer and inner directions are generated. The balance between these forces determines a force acting upon the wires. A scheme in which currents flowing through respective wires are directly controlled can be adopted, too. A pitch may be adopted so that no magnetic force is imposed on the wires even if a current is caused to flow.

As shown in FIG. 7, respective wires are electrically insulated. Such structure and power supply configuration can prevent current imbalance (or drift among wires peculiar to superconducting from occurring. Occurrence of resistance which is newly generated by changes in current (referred to as "alternating current loss") can be suppressed.

The structure of an ambient temperature terminal of the cable will now be described with reference to FIG. 9. In order to achieve vacuum adiabatic insulation, the cable system is of a double pipe structure comprising a pipe receiving the refrigerant therein and a pipe for evacuation and a portion through which the conductor is taken out to the ambient temperature atmosphere is of the above-mentioned type. The superconducting strands are connected to a feed-through (1) 911. The feed-through (referred to as hermetic seal") has a plurality of ceramic portions for electric insulation which are mounted on a metallic flange. Electrodes are disposed within the ceramic portions. Vacuum sealing and electrical insulation are simultaneously achieved. The pipe through which the refrigerant flows is connected to the vacuum adiabatic insulating area via feed-through 911 and copper leads 913 are connected to a feed-through 912 which separates the atmosphere from vacuum area, so that power cable lines 914 can be lead out to the ambient temperature atmosphere side. Since the inner pipe 905 becomes shorter due to thermal contraction, the condition of the inner pipe 905 when it is assembled at ambient temperatures is remarkably different from that shown in FIG. 9 as will be described hereafter. A thermoelectric semiconductor 915 is mounted on the feed-through 912. Current conduction causes Peltier-effect which induces a temperature difference, resulting in a reduction in heat invasion to a lower temperature portion. This is referred to as "Peltier current lead". The thermoelectric semiconductors 915 are connected to a power circuit, which is on the power transmission side or the power receiving side.

The refrigerant is fed to/from a pump by the double shell structure while it is not in contact with the ambient temperature atmosphere. A structure of the cable system in which a bellows pipe is inserted into a connection having a double shell structure to absorb flexing and contraction to some extent may be adopted. Such structure in which the bellows pipe is inserted into the connection having double shell structure is applicable to following various embodiments.

It is necessary to connect cables to each other when power is required to transmit at a long distance. The connection structure will be described with reference to FIG. 10.

Working to connect the superconducting cables has to be conducted at the connecting points. For this end, a work hole is provided. Two inner pipes having superconducting strands 1002 disposed therein are provided with a feed-through, respectively. The superconducting strands can be easily connected to each other via copper leads by accessing through the work hole.

In order to absorb (cope with) the thermal contraction due to cooling, the copper leads 1013 are provided with a margin of length which is in the order of several centimeters. An interterminal fixture 1016 for fixing both terminals of the pipes is mounted across two inner pipes having the feed-throughs 1 disposed therein so that the distance and the relative position between two inner pipes will not change.

The power loss at the part of the copper leads 1013 may be reduced by using superconducting strands 1002 in lieu of the copper leads 1013. In order to supply a cooling station disposed in the connection with power, a feed-through 2 (see FIG. 9) is disposed, from the feed-through 1, on the side of the pipe which separates between the atmosphere and the vacuum area, so that power is taken out therethrough. Since the superconducting strands 1002 are for direct current in FIG. 10, only one of polarities is illustrated. In this case, a thermoelectric semiconductor is used to reduce heat invasion. The inner pipe may be shorten due to thermal contraction by a length which may be several tens meters. Assembly at ambient temperatures will be described hereafter.

Figure 11:
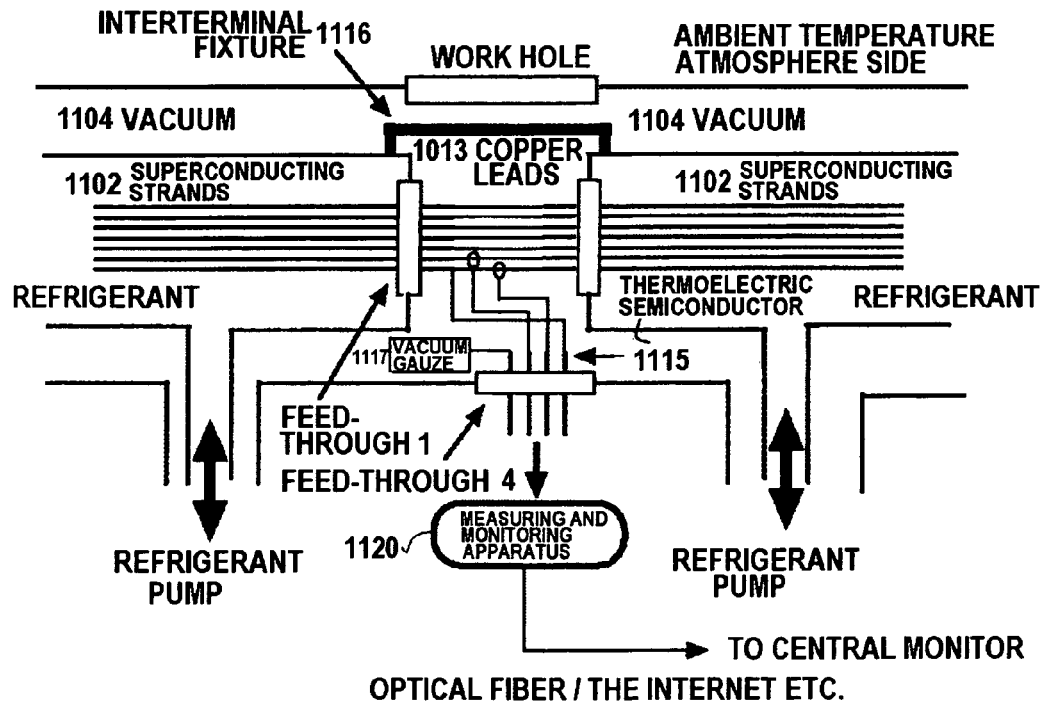
FIG. 11 shows the structure of a cable coupling portion/cooling station portion of one embodiment of the present invention.

The cooling station has to constantly conduct confirmation of integrity of the superconducting power transmission system. Monitoring of superconducting conditions is conducted. Various sensors are mounted on the connection, so that signals which are representative of various parameters are fed to the station which monitors the system. An example of system configuration is illustrated in FIG. 11. The sensors may include a voltage tap, current meter, vacuum gauze, magnetic sensor, thermometer, pressure gauze, displacement gauze, and strain gauze etc. The signals from these sensors are taken to the atmosphere side via the feed-through 4 are fed to a measuring and monitoring apparatus 1120. The measuring and monitoring apparatus 1120 includes instrumentation and computers and constantly observes the outputs from the sensors and sends the results to a central control and monitor system (not shown) via transmission lines, e.g., optical fibers, the Internet and a wireless communication system. Monitor signals from instruments of the cooling station are similarly fed to the central control and monitor system. Operation of the cooling station is determined based upon the real-time data. The temperatures at each part of the cable along its length can be continuously measured and monitored.

Figure 12:
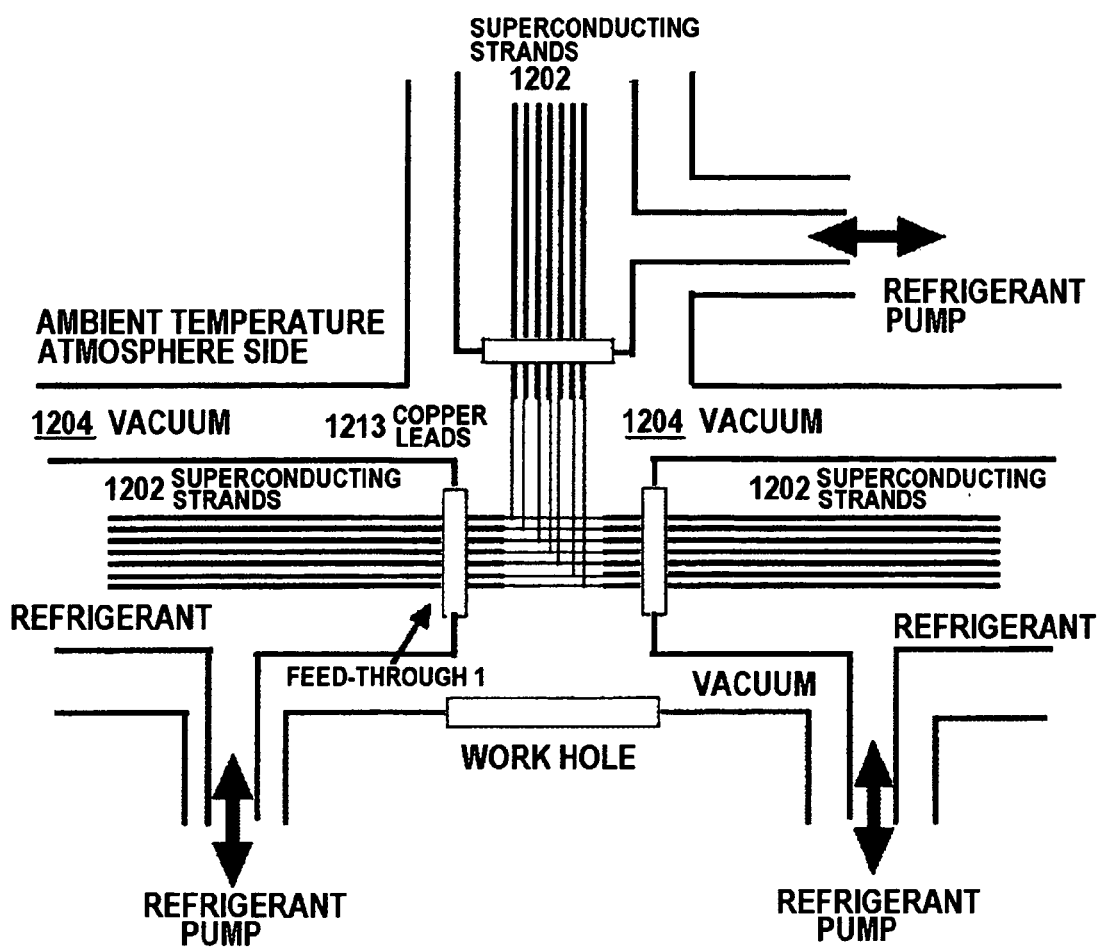
FIG. 12 shows the structure of a cable thermal contraction absorbing structure/cooling station portion of one embodiment of the present invention.

The necessity to branch a power transmission line comes out according to needs. An example of branch structure is shown in FIG. 12. Branching at the cooling stations is rational from a view of engineering point. In this example, connection of three superconducting lines is illustrated. The present invention is applicable to connection of more than two superconducting strands. The number of the superconducting strands on one side may not be equal to that on the other side. The branch structure is designed so that working such as connection can be conducted through the work hole. It is preferred that every branch is equipped with a supply of refrigerant, i.e., connection with a refrigerant pump, as shown in FIG. 12. The other structure of the connection for two cables in alignment may be equivalent to that of FIG. 11.

Now, a problem of the thermal contraction of the inner pipe will be described. If a stainless steel based material is used, the inner pipe having a length of 10 km will cause contraction of 30 m since its thermal contraction rate amounts to about 0.3%. It is necessary to absorb this thermal contraction at the cooling station.

Figure 10:
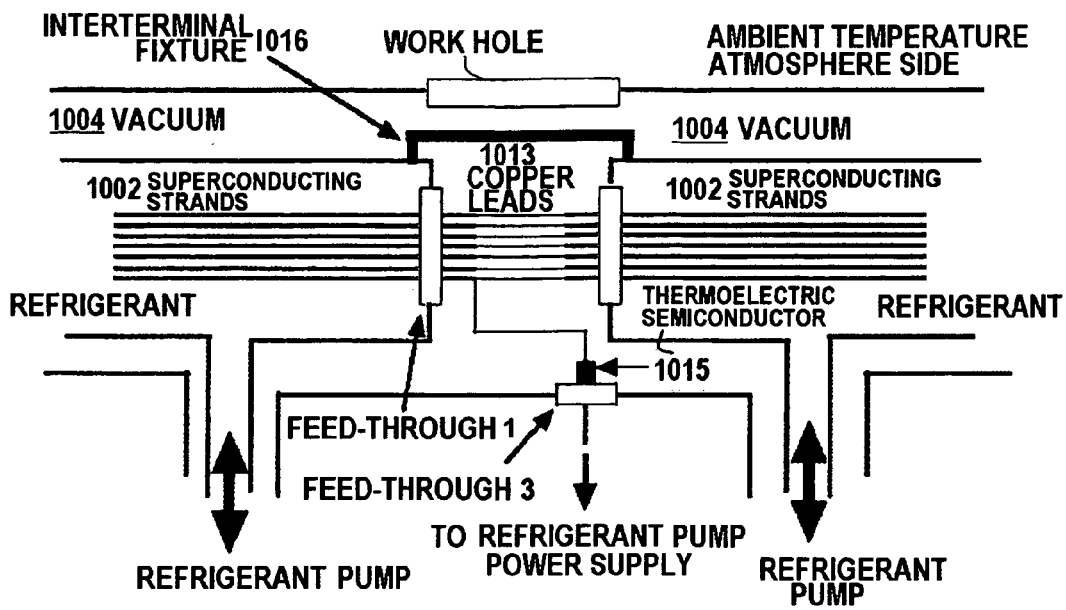
FIG. 10 shows the structure of a cable coupling portion/cooling station portion of one embodiment of the present invention.
Figure 13:
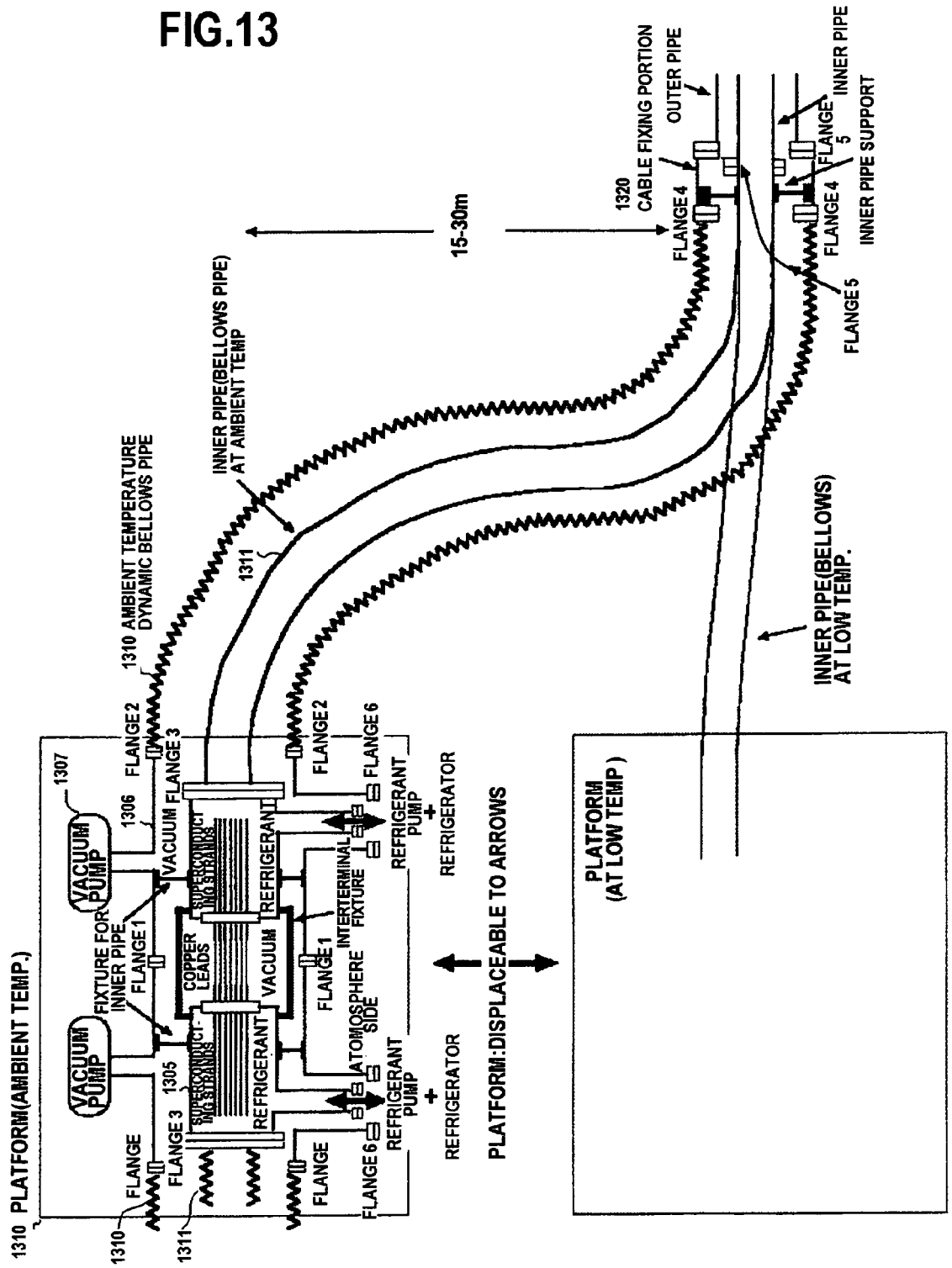
FIG. 13 shows the structure of a cable branch structure and coupling portion/cooling station portion of one embodiment of the present invention.

An exemplary configuration to absorb the thermal contraction in the present embodiment is illustrated in FIG. 13. At the cooling station, connection of two cables is carried out as shown in FIG. 10.

The inner/outer pipes used at the connection where two cables are connected to each other via copper leads comprise straight pipes jointed together, so that they will not be largely deformed by an external force and pressure. The two cables are mechanically connected to each other via a flange 1 and vacuum is maintained. The inner pipe 1311 is connected to the straight pipe 1305 at the connection via a flange 3. A dynamic bellows pipe (outer pipe) 1310, the length of which is changed depending upon the external force is used to keep the vacuum condition and the pipe 1310 is connected to a vacuum pump 1307 via the outer straight pipe 1306 and is ultimately connected to the outer pipe of the cable.

The dynamic bellows pipe 1310 is connected to a cable fixing portion 1320 which is fixed to a stationary body (e.g., building) via a flange 4 and is ultimately connected to the outer pipe of the cable. The inner pipe support structure is inserted into this portion so that the inner pipe is fixed in the radial central position of the cable system. Since the length of the inner pipe is changed due to thermal contraction, the inner pipe support structure is only fixed to an outer cable of the cable fixing portion (whereas axially slidable relative to the inner pipe).

The straight pipe portion which constitutes the connection is mounted, together with vacuum pumps, on a platform, which is displaceable in directions of arrows in the drawing. If the superconducting member which is located within the inner pipe is cooled after vacuum is generated, thermal contraction occurs and an assembly of the platform and the straight pipe portions thereon will be moved in a direction of an arrow. At this time, the inner pipe will contract along the length of the inner pipe support structure which is mounted on the cable fixing portion.

Ultimately the platform 1301 will move to a position shown in the lower side of FIG. 13 for absorbing the thermal contraction. The horizontal moving stroke of the platform corresponds to the thermal contraction of the inner pipe. The position of the thermally contracted inner pipe is also shown in the drawing. If the cable has a length of 10 km, the stroke to be absorbed would be 30 m. If the thermal contraction is absorbed at opposing ends of the cable, the stroke to be absorbed suffices to be 15 m. The ambient temperature dynamic bellows pipe portion has such a large diameter that it will not contact with the inner pipe. Similarly, the pipe diameter of the cable fixing portion is made larger and the strength of the inner pipe support structure is made higher in comparison with that used in the other positions. The inner pipe may be also a bellows pipe.

The super-insulation is disposed within the dynamic bellows pipe portion. The super-insulation is preliminarily shortened to such a length that it covers the inner pipe in a position where the super-insulation is at the final low temperature. In order to conduct cooling, it is necessary to connect the system to a refrigerant pump and a refrigerator. If the system is not placed on the movable platform, the system is connected to the pump and refrigerator through a dynamic bellows pipe via the flange 6.

It is the thermal contraction force which causes the platform to move. In order to prevent an excessive stress from imposing upon the pipe, a strain gauze is mounted on the platform and the position of the platform is externally controlled according to needs based upon data from the strain gauze at the phase while the temperature is lowered.

In order to control the movement of the platform, the platform may be placed upon rails or slide table.

Figure 14:
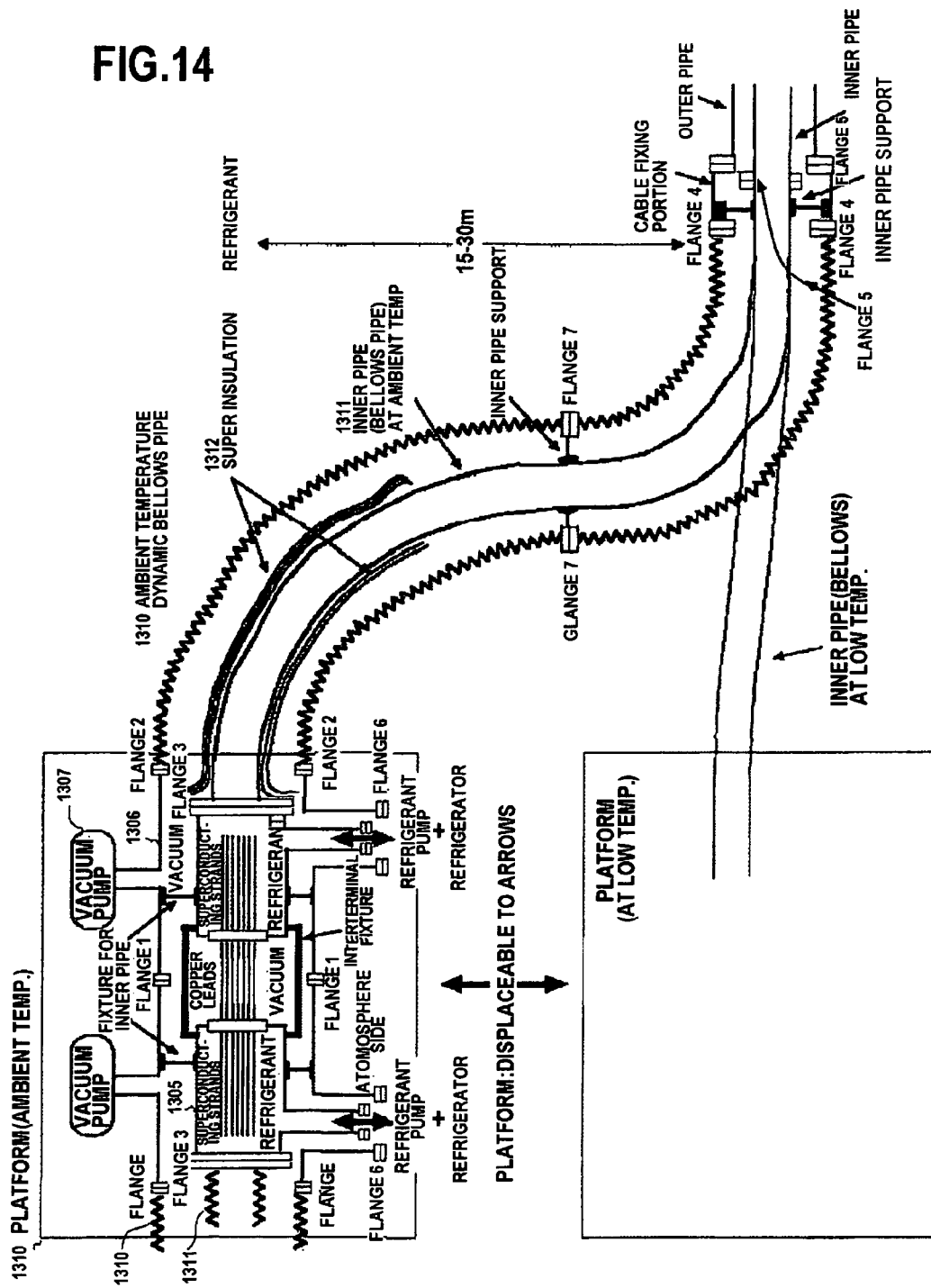
FIG. 14 shows the structure of a cable coupling portion/cooling station portion of one embodiment of the present invention.

Since the ambient temperature dynamic bellows pipe 1310 is curved, it may contact with the inner pipe even if the pipe diameter is made larger. In order to prevent this contact, at least one flange 7 may be disposed intermediary a length of the ambient temperature dynamic bellows pipe 1310, so that the inner pipe support structure is disposed within the flange 7 as shown in FIG. 14. If the position of the flange is controlled, the inner pipe is not only prevented from contracting with the dynamic bellows pipe, but it is also useful for relaxation of the stress. The inner pipe support structure enables the inner pipe to slide.

Since abrupt evacuation of a vacuum system which extends at a long distance is dangerous, a vacuum test is conducted for each of the separated cables prior to connection of two cables. In this case, two cables are isolated at the flanges 1, closing flanges are mounted on the flanges 1, respectively. Then, two pipes become independent vacuum systems, respectively, so that vacuum test can be conducted for each system.

Cooling test can be separately conducted by mounting closing flanges on the flanges 1 of two cables. In case of separate cooling test, the platform may be divided into two parts, which can be moved in an independent or interlocking manner.

Figure 9:
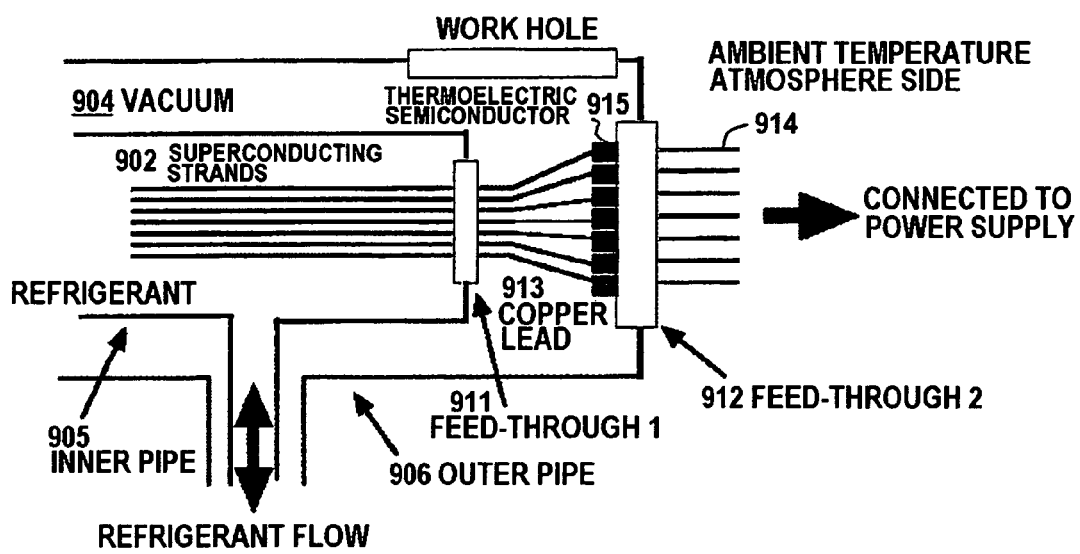
FIG. 9 shows the structure of the ambient temperature end portion of one embodiment of the present invention.

Electric test can be conducted by providing a terminal which enables power to be taken to the ambient temperature atmosphere side as shown in FIG. 9 via the feed-through 2. This electric test is separately conducted for two cables.

Final electric test is conducted by connecting two cables to each other electrically and hermetically for vacuum and mounting a cooling system.

A connection structure between a power supply and the superconducting strands will now be described. In the d. c. superconducting transmission system, the superconducting member transmits direct current. For power generation and power utilization, a. c. transmission is assumed. Therefore, conversion of a. c. (power generation)→d. c. (transmission) →a. c. (users) is necessary. Thus, inverters (conversion of d. c. to a. c. and vice versa) and converters (only conversion of a. c. to d. c.) are used in the system. For inverters/converters to enable conversion of high voltages and large currents, respective units are connected in a serial and parallel manner and are ultimately connected to one electrode and then matched or connected to other systems. The present embodiment does not adopt such configuration.

Figure 15:
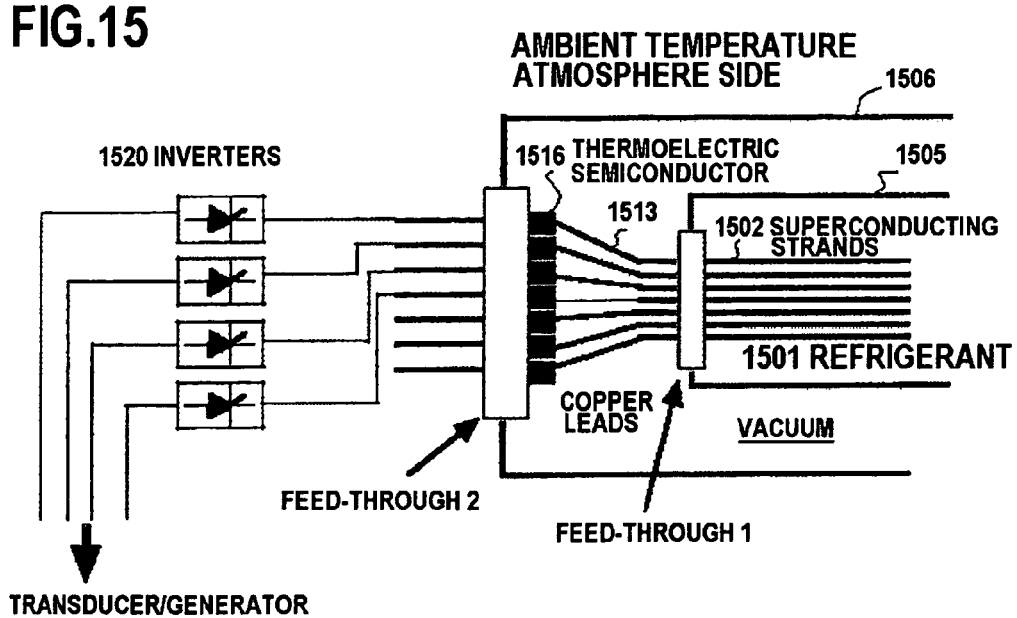
FIG. 15 shows a structure having invertors according to one embodiment of the present invention.

In FIG. 15, inverters 1520 are isolated from each other and one inverter 1520 is connected to each of the superconducting strands 1502 so that it has a current capacity which is equal to that of one strand. Such a circuit configuration enables the current flowing through each superconducting strand to be independently controlled provided that the voltages are matched. It is of course that respective superconducting strands are electrically insulated from one another. It is important to control the currents flowing through respective superconducting strands. Since the superconducting state depends upon the current density, magnetic field and temperature, the superconducting state is broken if a large current flows through only a given superconducting strand, which may cause a problem. This problem will not principally occur if the individual inverters are independently connected to the superconducting strands, respectively. Since such a circuit configuration makes it possible to readily identify which of the superconducting strands is connected to which of circuits, trouble shooting is easy, and it is possible to divide the circuit into a circuit of power supply line to the cooling station and a circuit of a main power supply line.

Since the inverters/converters are connected to the power supply and at least one of power receiving sides, they are capable of transmitting power depending upon a system to which they are individually connected. The power transmission capability depends upon the insulating voltage (breakdown voltage) between the strands. Therefore, if the system is configured as shown in FIG. 7, high interlayer insulation can be provided in addition to the insulation of only wires, the destination of each of the system for use can be determined one by one differently. Of course, the whole of the system may be integrated so that high power can be transmitted to one destination.

The inverters/converters should not necessarily be completely isolated to each other if the aim is limited to prevent the occurrence of current imbalance through the superconducting strands. A countermeasure to prevent the current imbalance in this case is shown in FIG. 16.

Figure 16:
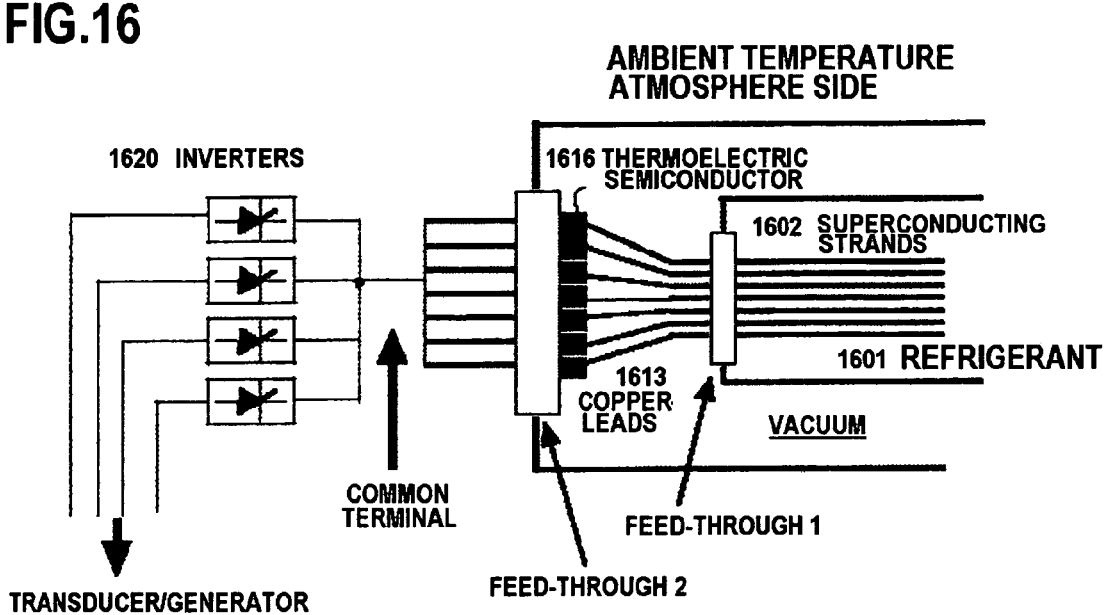
FIG. 16 shows a structure having invertors according to one embodiment of the present invention.

In case shown in FIG. 16, output from the inverters 1620 is only one. However, the outputs from the feed-throughs 2 which are located at the ambient temperature end to the superconducting strands 1602 are discrete circuits which are electrically isolated from one another.

By arranging in such a manner, electrical resistances of the strands of the feed-through 2 which are connected from the side of ambient temperatures, thermoelectric semiconductors 1616, lead lines 1613 and strands of the feed-through 1 are added to the resistance of the superconducting strands. Accordingly, a large current imbalance will not occur. Since working readiness is improved, the present invention is effective for a short range superconducting power transmission system or a system which is integrally operated.

There is a temperature difference across the ambient temperature terminal and Joule heat generation occurs due to the fact that copper leads 1613 which are normally conductive are used and heat invasion occurs. In order to prevent this heat invasion from occurring, a thermoelectric semiconductor 1616 having the Peltier effect is connected to the system. Another approach includes generating a low temperature gas from a refrigerant by a heat flux flowing from an ambient temperature portion to a low temperature portion, introducing the low temperature gas into the lead portion and conducting heat transfer on the surface of the leads. The gas which removes heat from the ambient temperature portion is discharged externally. This reduces the heat invasion. Such a configuration is generally used in the current leads of the superconducting coils and is referred to as "gas cooled type current lead".

Figure 17:
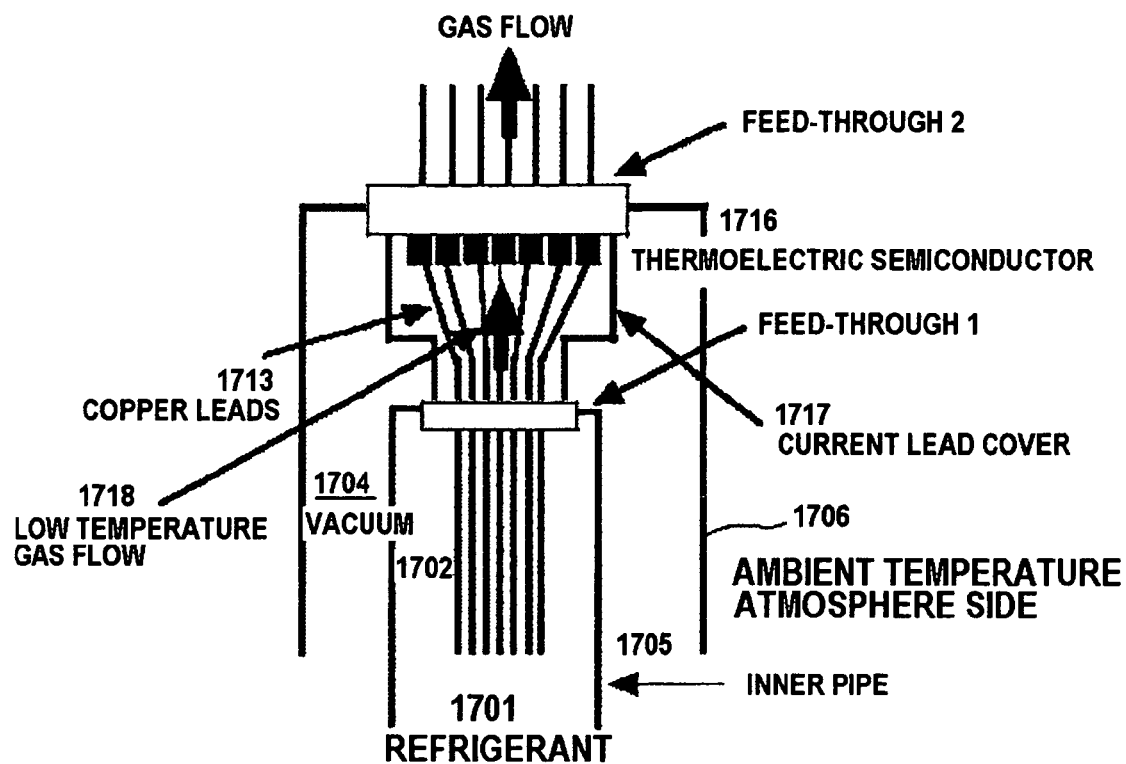
FIG. 17 shows a structure of a gas cooled ambient temperature end portion according to one embodiment.

FIG. 17 shows the structure of the gas cooled current leads. In an example shown in FIG. 17, the feed-through 1 is provided with small holes. A low temperature gas 1718 which flows from the holes to the side of the copper leads 1716 will flow toward the ambient temperature side and the gas which flows from small holes formed in the feed-through 2 will flow to the ambient temperature atmosphere side. In order to assure the gas flow, a current lead cover 1717 is provided to separate a vacuum adiabatic insulation section 1704. In order to improve heat transfer with gas, provision of the copper leads with fins or constriction (narrowing) of the gas passage is a common technique for the gas cooled current leads.

Figure 18:
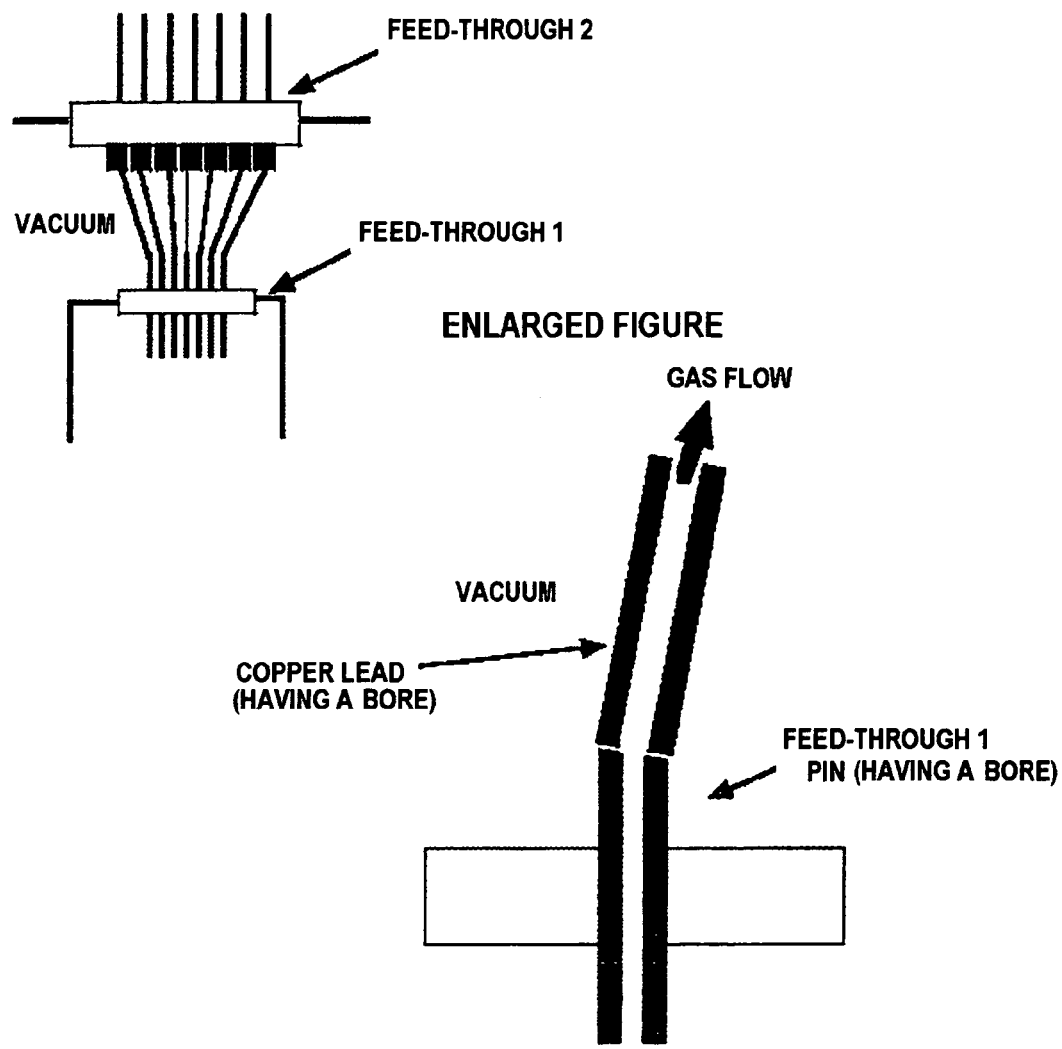
FIG. 18 shows a structure of a gas cooled ambient temperature end portion according to one embodiment.

Small bore is formed through the electrode bar which constitutes the feed-through 1 as a gas passage. Similar small hole is formed in each of the copper leads, thermoelectric semiconductor, and the feed-through 2 between the vacuum area and the atmosphere for passing gas therethrough. FIG. 18 shows this arrangement.

If the configuration of FIG. 18 is adopted, a current lead cover 1717 which is shown in FIG. 17 may be omitted since vacuum is kept by the copper leads and the like. Although not shown in FIG. 18, an approach to generate a low temperature gas by removing the refrigerant from a valve from another part and introducing heat from the leads thereto is common. Another approach to reduce the heat invasion by separately inserting a heater in the refrigerant, and conducting a current through the heater to control the gas generation is also common. When a refrigerant such as slush nitrogen which uses the latent heat of refrigerant ice is used, generation of the low temperature gas due to the heat inversion is prevented. In such a case, a system in which a gas is generated by introducing a refrigerant to a position where a heater is disposed is advantageous.

If a semiconductor element is used at low temperatures, the loss at the semiconductor element is remarkably low. In MOSFETs, the loss is reduced to about 10% at liquid nitrogen temperatures in comparison with those ambient temperatures. Although the inverter portion is disposed in the ambient temperature portion in cases shown in FIGS. 15 and 16, it may be disposed in a low temperature portion. If the efficiency of the refrigerator becomes 10% or more, the efficiency of the whole of the system can be enhanced. There is also an advantage in that the size of an apparatus can be reduced. Since the transformer which is located downstream of the inverter can be maintained at lower temperatures, use of a superconducting transformer is made possible. Maintaining of the whole of the apparatus at low temperatures can enhance the efficiency of the whole system.

In case of FIGS. 17 and 18, the cooling gas is finally discharged to the atmosphere. This discharged gas can be used for cooling the inverters and the like. Since these apparatus are often disposed in an underground room in buildings, applications of such a cooling gas are various. If the gas can not be discharged to the atmosphere, a structure in which the refrigerant is taken out from one end of the cable and returned to another end thereof as shown in FIG. 9 may be adopted. If such a structure is installed in an underground room of building, the necessity to install a refrigerant pump can be omitted. If a direct current is used, a cable may be directly connected to an electrode of the feed-through 2 which is at ambient temperature in a manner shown in FIG. 9 and is connected to apparatus. The structure is remarkably simplified. Since computers and the like use the direct current, a system for transmitting power therefore can be achieved.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A superconducting power transmission cable comprising:
   a first pipe encasing a superconducting member therein; and
   a second pipe disposed externally of said first pipe;
   said first pipe being vacuum adiabatically insulated from said second pipe;
   said cable further comprising at least a support member between said first and second pipes for supporting said first and second pipes in a radial direction.

2. A superconducting power transmission cable comprising:
   a first pipe encasing a superconducting member therein; and
   a second pipe disposed externally of said first pipe;
   said cable having a vacuum adiabatic insulating section between said first and second pipes;
   said cable further comprising:
   a first pipe support ring between said first and second pipes, which abuts on the outer wall of said first pipe;
   a second pipe support ring between said first and second pipe, which is adapted into the inner wall of said second pipe; and
   a support member disposed between said first and second pipe support rings.

3. A superconducting power transmission cable as defined in claim 1, wherein said first pipe is provided with a refrigerant passage, said superconducting member and an electrically insulating layer.

4. A superconducting power transmission cable as defined in claim 2, wherein said first pipe support ring abuts on the outer wall of said first pipe so that said first pipe support ring is movable relative to said first pipe.

5. A superconducting power transmission cable as defined in claim 2, wherein said first support ring abuts on the outer wall of said first pipe so that said first pipe support ring is slidable along said first pipe.

6. A superconducting power transmission cable as defined in claim 2, wherein said support unit comprises a support bar having one end connected to said first pipe support ring and the other end connected to said second pipe support ring.

7. A superconducting power transmission cable as defined in claim 2, wherein said support member comprises a first support bar having one end connected to said first pipe support ring;
   a second support bar having one end connected to said second pipe support ring; and
   a connecting member which connects the other ends of said first and second support bars to each other.

8. A superconducting power transmission cable as defined in claim 7, wherein said connecting member fixes said first and second support bars adapted for adjusting the relative position between the other ends of said first and second support bars and the longitudinal position of said first and second support bars.

9. A superconducting power transmission cable as defined in claim 1, wherein said first pipe is of bellows pipe.

10. A superconducting power transmission cable as defined in claim 2, wherein further comprising an insulator member formed of a plurality of aluminum coated sheets in said vacuum adiabatic insulating section.

11. A superconducting power transmission cable as defined in claim 1, wherein said superconducting member comprises a tape conductor;
   said pipe on which said tape conductor is wound being meshed or formed with holes.

12. A superconducting power transmission cable as defined in claim 1, wherein said superconducting member has a tape wire section comprising a former on which a plurality of tape wire layers are wound interposed with an interlayer insulating layer.

13. A superconducting power transmission cable as defined in claim 1, wherein at an ambient temperature end of said cable, superconducting strands which constitute said superconducting member are connected to a first feed-through which performs vacuum sealing and electrical insulation, said superconducting strands being connected to a second feed-through between said vacuum and the atmosphere via leads from said first feed-through;
a thermoelectric transducer element being connected to said second feed-through for reducing the heat invasion and being connected to an external power supply via a cable from said second feed-through.

14. A superconducting power transmission cable as defined in claim 1, wherein said cable comprises a connection portion for connecting said superconducting power transmission cable, termed a first cable, to a second cable, whereat, superconducting strands, which constitute said superconducting member of the first cable, are connected to a first feed-through which performs vacuum sealing and electrical insulation, said strands being further connected from the first feed-through to a second feed-through of the second cable via a lead portion;
said superconducting strands constituting said superconducting member of the second cable are connected to the second feed-through of the second cable;
to said lead portion is connected a thermoelectric transducer element, and is connected a third feed-through which reduces heat invasion into a lower temperature portion.

15. A superconducting power transmission cable as defined in claim 14, wherein said superconducting power cables are fixed to each other by a fixing apparatus.

16. A superconducting power transmission cable system comprising at least one cable as defined in claim 1, wherein said system comprises a branch connection between two of said superconducting power transmission cable, termed "first cable" and "second cable", at which branch connection;
superconducting strands constituting said superconducting member of the first cable are connected to a first feed-through performing vacuum sealing and electrical insulation and are connected to a third feed-through for the second cable via a lead portion to which a branch cable is to be connected; and
superconducting strands constituting a superconducting member of the branch cable are connected to said lead portion via another feed-through for the branch cable, thereby forming the branch connection.

17. A superconducting power transmission cable system comprising:
said superconducting power transmission cable as defined in claim 14;
a sensor including a vacuum gauze at said lead portion; and
a monitor apparatus for monitoring a result of measurement of said sensor.

18. A superconducting power transmission cable system comprising said cable as defined in claim 1,
said system further comprises a connection portion for connecting said super-conducting power transmission cable, termed "first cable", with another second cable,
said connection portion being connected with said superconducting power transmission cable, termed as a "first cable", via a bellows cable having outer and inner bellows,
said connection portion comprising a first pipe and a second pipe receiving the first pipe which is connected with the first pipe of the first cable via the inner bellows,
said second pipe being connected to a cable fixing portion via said outer bellows that is variable in length and is evacuated;
said inner bellows being connected to said first pipe in said cable fixing portion, thereby providing a connection with the first cable.

19. A superconducting power transmission cable system as defined in claim 18, wherein
said cable fixing portion comprises a support member which supports a first pipe within said cable fixing portion.

20. A superconducting power transmission cable system as defined in claim 18, wherein
said superconducting power transmission cable connecting portion and a platform which encases said first pipe are movable.

21. A superconducting power transmission cable system as defined in claim 18, wherein said system further comprises:
a flange between opposing ends of said outer bellows pipe; and
a support member which supports said first pipe within said outer bellows pipe at said flange.

22. A superconducting power transmission cable system comprising said cable as defined in claim 1, wherein said cable comprises an ambient temperature end of said cable, at which superconducting strands constituting said superconducting member are connected to a first feed-through performing vacuum sealing and electrical insulation,
said superconducting strands being connected to a second feed-through disposed between said vacuum and an atmosphere side from said first feed-through via a lead portion;
one of said superconducting strands being connected to corresponding one inverter via said second feed-through.

23. A superconducting power transmission cable system comprising said cable as defined in claim 1,
wherein said cable comprises an ambient temperature end of said cable, at which superconducting strands constituting said superconducting member are connected to a first feed-through performing vacuum sealing and electrical insulation,
said superconducting strands being connected to a second feed-through disposed between said vacuum and an atmosphere side from said first feed-through via leads;
a plurality of cables output from said second feed-through being commonly connected to a commonly connected output of a plurality of inverters.

24. A superconducting power transmission cable system as defined in claim 22, wherein
said system comprises a thermoelectric transducer element which is connected to said lead portion for reducing heat invasion.

25. A superconducting power transmission cable system comprising said cable as defined in claim 1, wherein said cable comprises an ambient temperature end of said cable, at which superconducting strands constituting said superconducting member are connected to a first feed-through performing vacuum sealing and electrical insulation,
said superconducting strands being connected to a second feed-through disposed between said vacuum and an atmosphere side from said first feed-through via a lead portion;
a cable being connected to said super-conducting strands at their ambient temperature side thereof,
said lead portion comprising a gas cooled current lead which is cooled with a low temperature gas from a refrigerant.

26. A superconducting power transmission cable system comprising said cable as defined in claim 22, wherein
said system comprises a cover which encases said lead portion and covers a space between said first and second feed-throughs; a low temperature gas from said refrigerant for cooling said superconducting strands being caused to flow within said cover.

27. A superconducting power transmission cable system comprising said cable as defined in claim 1, wherein said cable comprises an ambient temperature end of said cable, at which superconducting strands constituting said superconducting member are connected to a first feed-through performing vacuum sealing and electrical insulation, said superconducting strands being connected to a second feed-through disposed between said vacuum and an atmosphere side from said first feed-through via a lead portion;

a cable being connected to said superconducting strands on the ambient temperature side thereof via the second feed-through;

an electrode rod constituting said first feed-through being in the form of hollow cylinder and a low temperature gas flows therethrough; and a lead connected to said electrode bar being in the form of hollow cylinder and a low temperature gas flows therethrough.

28. A superconducting power transmission cable as defined in claim 1, wherein at least one or two of said first and second pipes are made of a ferromagnetic material.

29. A superconducting power transmission cable as defined in claim 1, wherein said cable comprises a ferromagnetic material externally of a adiabatically insulating double pipe structure of said first and second pipes.

30. A superconducting power transmission cable as defined in claim 29, wherein said ferromagnetic material comprises a directional silicon steel plate.

* * * * *